(12) United States Patent
Suri et al.

(10) Patent No.: US 8,422,852 B2
(45) Date of Patent: Apr. 16, 2013

(54) AUTOMATED STORY GENERATION

(75) Inventors: Nitin Suri, Redmond, WA (US); Sriram Subramanian, Redmond, WA (US); William David Sproule, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 12/757,055

(22) Filed: Apr. 9, 2010

(65) Prior Publication Data

US 2011/0249953 A1    Oct. 13, 2011

(51) Int. Cl.
    *H04N 9/80*      (2006.01)

(52) U.S. Cl.
    USPC ............... 386/239; 386/E5.003; 386/278

(58) Field of Classification Search ............ 386/239, 386/E5.003, 278
See application file for complete search history.

(56) References Cited

U.S. PATENT DOCUMENTS

| | | | |
|---|---|---|---|
| 7,583,355 B2 | 9/2009 | Bogdanowicz et al. | |
| 2004/0218894 A1* | 11/2004 | Harville et al. | 386/46 |
| 2008/0155422 A1* | 6/2008 | Manico et al. | 715/731 |
| 2009/0003794 A1 | 1/2009 | Heatherly et al. | |
| 2009/0219291 A1 | 9/2009 | Lloyd et al. | |
| 2010/0157352 A1* | 6/2010 | Morales et al. | 358/1.15 |

FOREIGN PATENT DOCUMENTS

| | | |
|---|---|---|
| JP | 08314890 A | 11/1996 |
| JP | 2001218160 A | 8/2001 |
| KR | 1020070120706 A | 12/2007 |
| KR | 1020090091311 A | 8/2009 |
| WO | 9630844 A1 | 10/1996 |
| WO | 2009014904 A2 | 1/2009 |

OTHER PUBLICATIONS

"International Search Report", Mailed Date: Apr. 28, 2011, Application No. PCT/US2010/045891, Filed Date: Aug. 18, 2010, pp. 9.
"Season's Greetings!!: Video Holiday Cards using Movie Maker", Retrieved at <<http://windowslivewire.spaces.live.com/blog/cns!2F7EB29B42641D59!44932.entry>> Dec. 1, 2009, pp. 4.
"MythVideo", Retrieved at <<http://www.mythtv.org/wiki/MythVideo>> Nov. 12, 2009, pp. 9.
Jinhong, et al., "Filmmaking Production System with Rule-based Reasoning", Retrieved at <<http://www-ist.massey.ac.nz/dbailey/sprg/IVCNZ/Proceedings/IVCNZ_66.pdf>> Nov. 2003, pp. 366-371.

(Continued)

*Primary Examiner* — Thai Tran
*Assistant Examiner* — Girumsew Wendmagegn
(74) *Attorney, Agent, or Firm* — L. Alan Collins; Collins & Collins Intellectual, LLC

(57) ABSTRACT

Automatic story production is implemented by the utilization of theme scripts with user assets to generate a quality finished product with minimum user input or direction. A user chooses a predesigned theme script to be applied to the user's assets to automatically create a story with a particular look and feel. Metadata and feature information, when available, is automatically gathered from the user assets to personalize the generated story. A user can include additional information and/or alter any aspect of the generated story to further personalize the resultant finished product.

17 Claims, 11 Drawing Sheets

OTHER PUBLICATIONS

"Final Cut Pro Opens Up with XML Interchange Format", Retrieved at <<http://developer.apple.com/appleapplications/fcpxml.html>> Aug. 7, 2009, pp. 8.

Ahanger, et al., "Automatic Digital Video Concepts1", Retrieved at <<http://66.102.9.132/search?q=cache:-EHwoY01zisJ:citeseerx.ist.psu.edu/viewdoc/download%3Fdoi%3D10.1.1.31.4045%26rep%3Drep1%26type%3Dpdf+Automatic+Digital+Video+Production+Concepts1&cd=1&hl=en&ct=clnk>> Sep. 2, 1998, pp. 28.

* cited by examiner

AUTOMATED STORY GENERATION

BACKGROUND

Users can create stories, e.g., movies, from user assets such as user images, videos, and audio files. Users can use a computing device to render individual manipulations for combining, grouping and ordering a set of user assets for output presentation. The generated movies can be desirable for showcasing the user assets.

With the plethora of media and messages vying for individuals' attentions via their computers, televisions, cell phones, radios, etc, what can assist any particular presentation to stand out to an audience, along with the story subject, is the caliber of polish with which the story is generated.

Users have to commit time and effort to create a story from their user assets as there can be many factors and elements a user will contend with in generating a finished product. Additionally, creating a finished product from a set of user assets can require users to have the skills, artistic talent and knowledge of the software for implementing the details to generate the intended resultant product.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include systems and methodology for enabling automatic and personalized user story creation.

In embodiments user content, or assets, e.g., images, video and/or audio files, are automatically analyzed and organized within a user story, e.g., a movie. In embodiments rules of a theme script that is designed to create a particular feeling or theme for a finished user story are automatically applied to user assets to create a predesigned look for the user assets which become elements of the generated user story.

In embodiments an introduction section and an end section for the user story are automatically created pursuant to theme script rules and using user assets, metadata and/or feature information mined from analyzed user assets.

In embodiments the user story is automatically organized into chapters pursuant to theme script rules and the nature and quantity of the user assets.

In embodiments the user story is personalized by the inclusion of captions that are automatically generated from information mined from analyzed user assets and/or are automatically generated with generic text that can be replaced by user input when the necessary asset information is unavailable or nonexistent.

In embodiments various treatments, e.g., transitions, effects, music inclusions, titles, credits, caption designs, etc., are applied to or generated for elements of the user story pursuant to theme script rules. In an aspect of these embodiments the treatments are intended to help create a personalized user story with a particular look and feel.

In embodiments elements of the automatically generated user story can be modified by a user to further enhance the personalization of the final user story. In embodiments a finalized user story can be stored and/or published, e.g., to one or more websites, one or more devices, e.g., cell phones, etc.

BRIEF DESCRIPTION OF THE DRAWINGS

These and other features will now be described with reference to the drawings of certain embodiments and examples which are intended to illustrate and not to limit, and in which.

DETAILED DESCRIPTION

In the following description, for purposes of explanation, numerous specific details are set forth in order to provide a thorough understanding of embodiments described herein. It will be apparent, however, to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
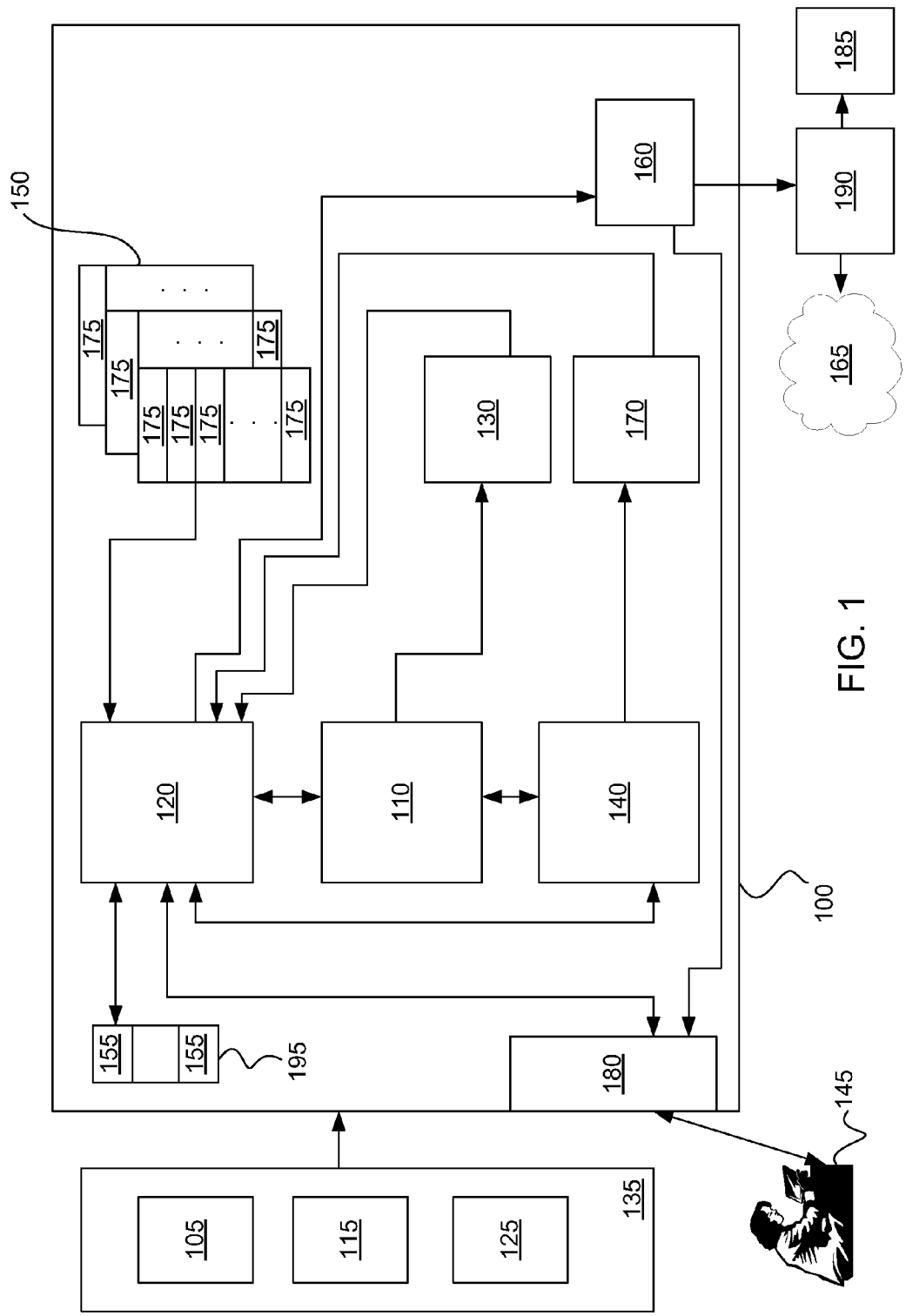
FIG. 1 depicts an embodiment movie production system that automatically transforms and arranges user content to generate a story.

FIG. 1 depicts an embodiment movie production system 100 that takes as input user content 135, or user assets 135, and arranges the user content 135 to generate a personal story, e.g., movie, 160 with high quality and minimum user effort. In embodiments user content 135 can include, but is not limited to, user images 105, user video 115, also referred to herein as video clips, user audio 125, user graphics and/or user text files. In an embodiment the user assets 135 are each composed of one or more frames; i.e., one or more images in a set of images 105, one or more stills in a video 115, one or more predefined timed segments of an audio file 125, etc.

In an embodiment the product, e.g., movie, 160 generated by the movie production system 100 is a resultant story that is told by the user assets 135 included therein along with any dynamically generated elements 155, e.g., a scrapbook page of selected user images 105, etc., and preselected elements, e.g., clipart, music, etc. As used herein, the term movie is intended to refer to any product, or story, generated by an embodiment movie production system 100 using user assets 135. In an embodiment a movie 160 consists of a collection of one or more frames wherein each frame can be, or consist of, a user asset, a modified user asset, a dynamically generated element 155, predefined content, etc., or a combination thereof, etc.

Figure 2:
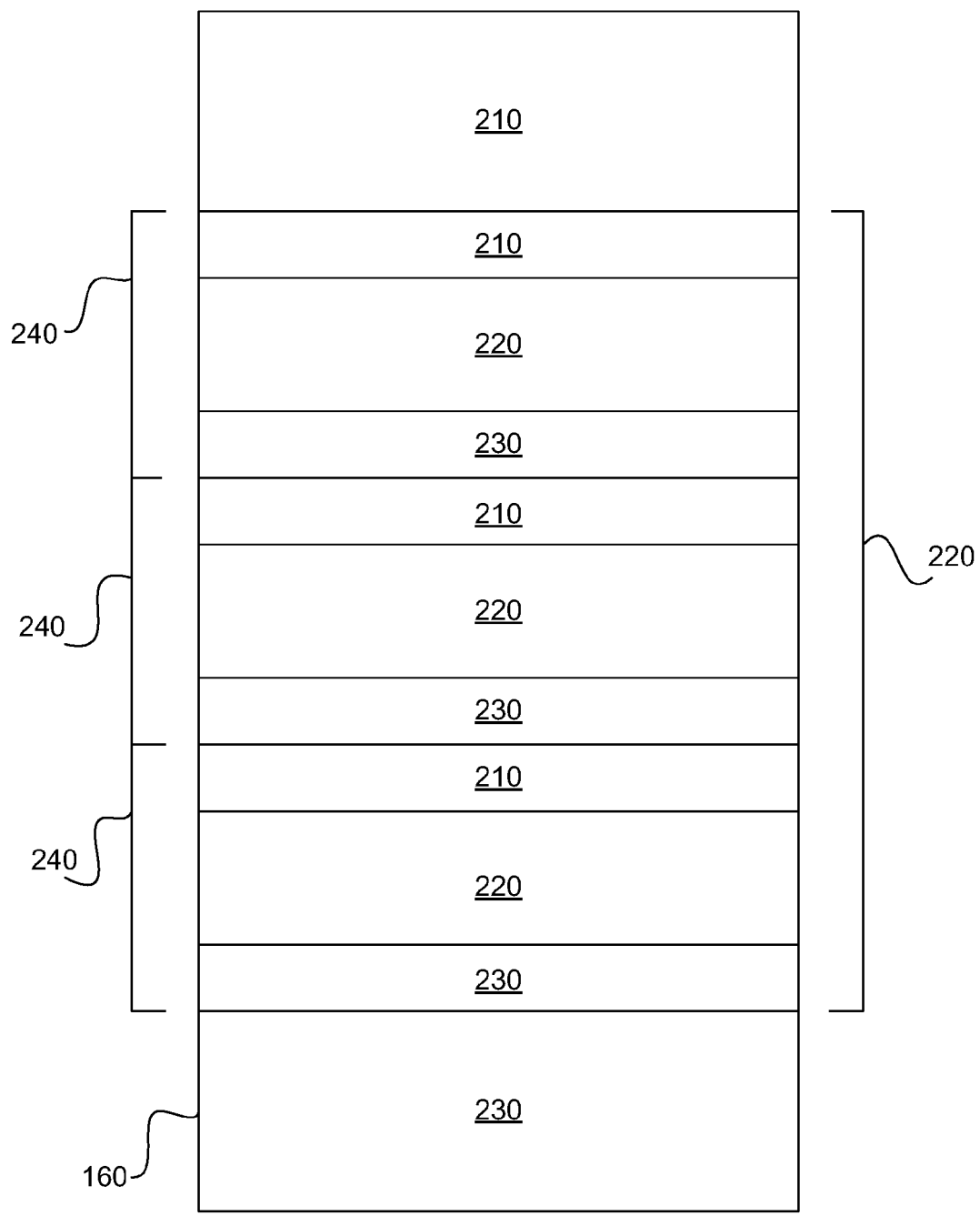
FIG. 2 depicts sections of an embodiment generated story.

In an embodiment the movie 160 generated by the movie production system 100 can have three sections, as depicted in FIG. 2. An embodiment first movie section is an intro, or introduction, section 210. In an embodiment an intro section 210 is a section added to the beginning of the movie 160 that introduces the movie 160. In an aspect of this embodiment an intro section 210 can include one or more titles, one or more credits, date information, user content 135 information, one or more phrases, e.g., lyrics to a song, words from a poem, captions, etc. In an aspect of this embodiment an intro section 210 can also, or alternatively, include content 155, or elements 155, that is dynamically generated from user content 135; e.g., a collage formed from users assets 135.

An embodiment second movie section is the mid, or body, section 220. In an embodiment the mid section 220 is the section of the movie 160 that is the story produced from the user assets 135. In an embodiment the mid section 220 includes user assets 135, unaltered, transformed, edited and/or modified. In an embodiment the mid section 220 can also, or alternatively, include elements 155 dynamically generated from user assets 135, e.g., a collage of images 105 arranged on a predesigned background, frame captions created from mined metadata, etc. In an embodiment frames of the mid section 220 of the movie 160 can also, or alternatively, include predefined content; e.g., a music score, clip art, etc.

An embodiment third movie section is the outro, or end, section 230. In an embodiment an end section 230 is a section added to the end of the movie 160 that concludes the movie 160. In an aspect of this embodiment an end section 230 can include one or more titles, one or more credits, date information, user content 135 information, one or more phrases, e.g., lyrics to a song, words from a poem, captions, etc. In an aspect of this embodiment an end section 230 can also, or alternatively, include elements 155 dynamically generated from user content 135.

In an embodiment the mid section 220 of a movie 160 can be divided into two or more chapters, or sections, 240, each with its own subject, or content, or sub-theme. In this embodiment each chapter 240 has a mid section 220. In an aspect of this embodiment each chapter 240 can also include an intro section 210. In an aspect of this embodiment each chapter 240 can also, or alternatively, include an end section 230.

In embodiments a movie 160 can consist of just a mid section 220, an intro section 210 and a mid section 220, a mid section 220 and an end section 230, or an intro section 210, a mid section 220 and an end section 230.

Referring back to FIG. 1, in an embodiment theme scripts, or script files, 150 of the movie production system 100 are designed to create stories, e.g., movies, 160 from user assets 135. In an embodiment the theme scripts 150 are generated with creative input from one or more artists and/or one or more graphic designers who choose harmonious styling elements for a particular theme. In an embodiment theme scripts 150 can also, or alternatively, be generated by a user 145 or any one desiring to author a script file 150. In an embodiment theme scripts 150 can also, or alternatively, be generated by the execution of script design software.

In an embodiment the theme scripts 150 are in a human-readable format which provides for efficient maintenance and flexible modification of a theme script 150.

An embodiment theme application engine 120 of a movie production system 100 has the capability to utilize a user chosen theme script 150 to automatically arrange and transform user assets 135 in such a way that the resultant story, or movie, 160 is of a user-perceived high quality with minimal user effort required. In an embodiment the theme application engine 120 runs a theme script 150 against user assets 135 to create a story, or movie, 160. In an embodiment each theme script 150 contains information, or rules 175, on how the user assets 135 should be filtered, arranged and/or transformed (visually and/or audioally) to create a movie 160 with a particular theme. In an embodiment a theme refers to a mood, an aesthetic style or an event, e.g., joyous, sporty, birthday, wedding, sepia, colorful, etc. In an embodiment theme scripts 150 provide an abstract mechanism for defining how an end product, e.g., movie 160, should look and sound without the need to know any details of the user assets 135.

In an embodiment, before a theme is applied to a set of user assets 135 metadata and feature information is mined from the user content 135; e.g., any tags related to the user content 135, any tags identifying people in the user content 135, any tags identifying the location of the pictured user content 135; feature information on where faces are located in a frame of user content 135, etc. Mining some of this information can be computationally expensive and time consuming. Thus, in an embodiment the mining of metadata and feature information from user content 135 is done in the background when the user content 135 is first input, or made available, to the movie production system 100.

In an embodiment, when user content 135 is input to the movie production system 100 it is automatically fed through an embodiment metadata feature extraction and analysis engine 110, also referred to herein as an analysis engine 110. In an embodiment the analysis engine 110 executes asynchronously in the background using spare CPU cycles. In an embodiment the analysis engine 110 has the capability to extract, analyze and store metadata and feature information from user content 135 that can be used later by an embodiment theme application engine 120 in creating a personal movie 160. In an embodiment the analysis engine 110 stores the mined metadata and feature information in one or more metadata databases 130. In other embodiments mined metadata and feature information is stored and referenced by one or more of a variety of storage constructs, including but not limited to, metadata databases 130, tables, lists, linked lists, etc.

In an embodiment, before a theme is applied to a set of user assets 135 one or more analyses are performed on the user assets 135. In an embodiment the analyses performed can include statistical analysis to determine how much is changing over x frames in a user video 115 or user audio file 125; e.g., how much action is occurring over x frames of a user video 115. In an embodiment the analyses performed can include a determination of the loudness of the audio portion of a user video 115 or subset of the user video 115 or the loudness of a user audio file 125 or subset of a user audio file 125. In an embodiment the analyses performed can include a determination of the clarity of one or more user images 105 and/or one or more frames of a user video 115; i.e., a determination of how in focus one or more user images 105 and/or one or more user video frames are. In an embodiment the analyses performed can include a determination of whether one or more images 105 and/or one or more frames of a user video 115 have red-eye. In embodiments a variety of additional and/or different analyses can be performed on a set of user assets 135. In an embodiment information derived from one or more analyses, also referred to herein as asset modification information or details, can be used to identify modifications, or corrections, that can be made to one or more user assets 135; e.g., modifications for red-eye, modifications for out-of-focus user images 105 or frames of a user video clip 115, etc.

In an embodiment the analysis engine 110 has the capability to perform analyses on a set of user assets 135. Analyses of the user assets 135 can be computationally expensive and time consuming. Thus, in an embodiment the analyses of the user content 135 is done in the background when the user content 135 is first input to the movie production system 100. In an embodiment, when user content 135 is input to the movie production system 100 it is automatically fed through an embodiment analysis engine 110. In an embodiment the analysis engine 110 executes asynchronously in the background using spare CPU cycles to perform analyses on the user content 135.

In an embodiment movie production system 100 an adaptation engine 140 has the capability to use asset modification information from the analysis engine 110 to modify, or correct, one or more user assets 135. For example, the adaptation engine 140 corrects red eyes, adjusts lighting and exposure, shortens or otherwise segments a video 115 for specific content and/or to reduce duplicity or redundancy, deletes or modifies out-of-focus frames in a video 115, etc. In an embodiment the resultant modified user asset(s) are stored in one or more asset databases 170. In other embodiments modified user assets are stored and referenced by one or more of a variety of storage constructs, including but not limited to, asset databases 170, tables, lists, linked lists, etc. In this manner the user assets 135 remain as inputted and are unaltered by the embodiment movie production system 100 and the movie production system 100 is non destructive to user content 135.

In an embodiment the adaptation engine 140 has the capability to take directions from the theme application engine 120 and apply theme script rules 175 to user assets 135. For example, the adaptation engine 140 can crop one or more user images 105 as directed by one or more theme script rules 175 to zoom in on a particular image feature; e.g., a person, a geographic feature, e.g., mountain or river, etc. As another example the adaptation engine 140 can impose an effect on user assets 135; e.g., transpose user assets 135 to black-and-white, fade in or fade out on one or more user asset frames, etc. In an embodiment the resultant modified user asset(s) are stored in one or more asset databases 170. In other embodiments modified user assets are stored and referenced by one or more of a variety of storage constructs, including but not limited to, asset databases 170, tables, lists, linked lists, etc. In this manner the original user assets 135 remain unaltered by the embodiment movie production system 100.

As noted, in an embodiment each theme script 150 contains rules 175 that define the movie 160 to be generated. In an embodiment each theme script 150 has rules 175 that, when applied, create the format of the movie 160, e.g., size of the mid section 220, number and ordering of chapters 240 in the mid section 220, etc. In an embodiment each theme script 150 contains rules 175 for the contents of any intro section(s) 210, the contents of the mid section 220, and the contents of any end section(s) 230.

In an embodiment each theme script 150 can contain rules 175 to be applied to user assets 135 to generate transformations on one or more user assets 135 by, e.g., correlating metadata and feature information mined from or otherwise related to the user assets 135 with the theme script rules 175. In this manner user assets 135 can be transposed to suit the theme of the selected script file 150; e.g., user assets 135 can be modified to be black-and-white, cropped to depict specific content, etc.

In an embodiment each theme script 150 can contain rules 175 that identify special keywords that can be replaced with metadata or feature information extracted from the user assets 135, e.g., names identifying faces of people in the images 105 and/or video 115, location feature identification information, e.g., mountain range, waterfall, etc., in the images 105 and/or video 115, etc. In this manner the generated movie 160 is rendered personal to the user 145 in accordance with the user assets 135.

In an embodiment the theme scripts 150 can have as a target a number of user assets 135 or range of a number of user assets 135. In an embodiment the theme scripts 150 can accommodate a smaller number of user assets 135 than targeted. An embodiment theme script 150 targeted to accommodate more than the existing number of user assets 135 can reuse user assets 135 among the frames of the generated movie 160 in an orderly or random pattern in order to generate a movie 160 with a sufficient desired length. An embodiment theme script 150 targeted to accommodate more than the existing number of user assets 135 can spread the existing user assets 135 among the frames of the generated movie 160 in such a manner as to include duplicative user assets 135 but with differing treatments, e.g., effects, transitions, etc., in order to generate a movie 160 with a sufficient desired length. In an aspect of these embodiments a theme script 150 will generate a mid section 220 of a movie 160 that has more frames than user assets 135.

An embodiment theme script 150 targeted to accommodate more than the existing number of user assets 135 can generate a shorter play-length movie 160 that coincides with the existing user asset set. An embodiment theme script 150 targeted to accommodate more than the existing number of user assets 135 can increase the time spent on one or more user assets 135 included in frames in the movie 160 to generate a movie 160 of a predetermined play-length or within a predetermined play-length time span. An embodiment theme script 150 targeted to accommodate more than the existing number of user assets 135 can create frames of a movie 160 by dynamically generating elements 155 to be included in the movie 160 from the user assets 135, e.g., generating additional images from user asset video clips 115 and/or portions of user asset images 105, generating additional video clips by dividing existing user asset video clips 115 into smaller play-length videos, generating scrapbook pages with user assets 135, etc. In other embodiments theme scripts 150 targeted to accommodate more than the existing number of user assets 135 can manage a smaller set of user assets 135 with a combination of one or more of these embodiment approaches and/or with other approaches.

In an embodiment the theme scripts 150 can manage a larger number of user assets 135 than are targeted to be accommodated in a movie 160. An embodiment theme script 150 targeted to accommodate less than the existing number of user assets 135 can determine not to include all the user assets 135 in the movie 160. An embodiment theme script 150 targeted to accommodate less than the existing number of user assets 135 can include additional chapters 240, longer chapters 240, a longer mid section 220, etc. in the generated movie 160 to manage all or a larger subset of the user assets 135 than targeted for. An embodiment theme script 150 targeted to accommodate less than the existing number of user assets 135 can shorten the frame display time for one or more of the user assets 135 and/or speed up the output of one or more user asset video clips 115 included in the generated movie 160. In other embodiments theme scripts 150 targeted to accommodate less than the existing number of user assets 135 can manage a larger set of user assets 135 with a combination of one or more of these embodiment approaches and/or with other approaches.

In an embodiment a theme script 150 can contain rules 175 for the theme application engine 120 to apply to dynamically generate elements 155 for the movie 160. Such dynamically generated elements 155 can include, but are not limited to, frame background designs, scrapbook pages, collages, additional images generated from still frames of a user asset video 115, additional images generated from differing regions of a user asset image 105, etc. In an embodiment dynamically generated elements 155 are stored in one or more movie asset databases 195. In other embodiments dynamically generated elements 155 are stored and referenced by one or more of a variety of storage constructs, including but not limited to, movie asset databases 195, tables, lists, linked lists, etc.

In an embodiment a theme script 150 can contain rules 175 for the theme application engine 120 to apply for the inclusion of predefined content within the movie 160. Such additional predefined content can include, but is not limited to, clip art, audio tracks, caption style, etc.

In an embodiment there are various groups of theme script rules 175 to effect a variety of resultant content, or elements, included in a generated movie 160. Each theme script 150 can contain rules 175 from one or more of these groups which are selected and/or tailored to define a portion of the resultant movie 160 with the identified theme from the theme script 150.

Figure 3:
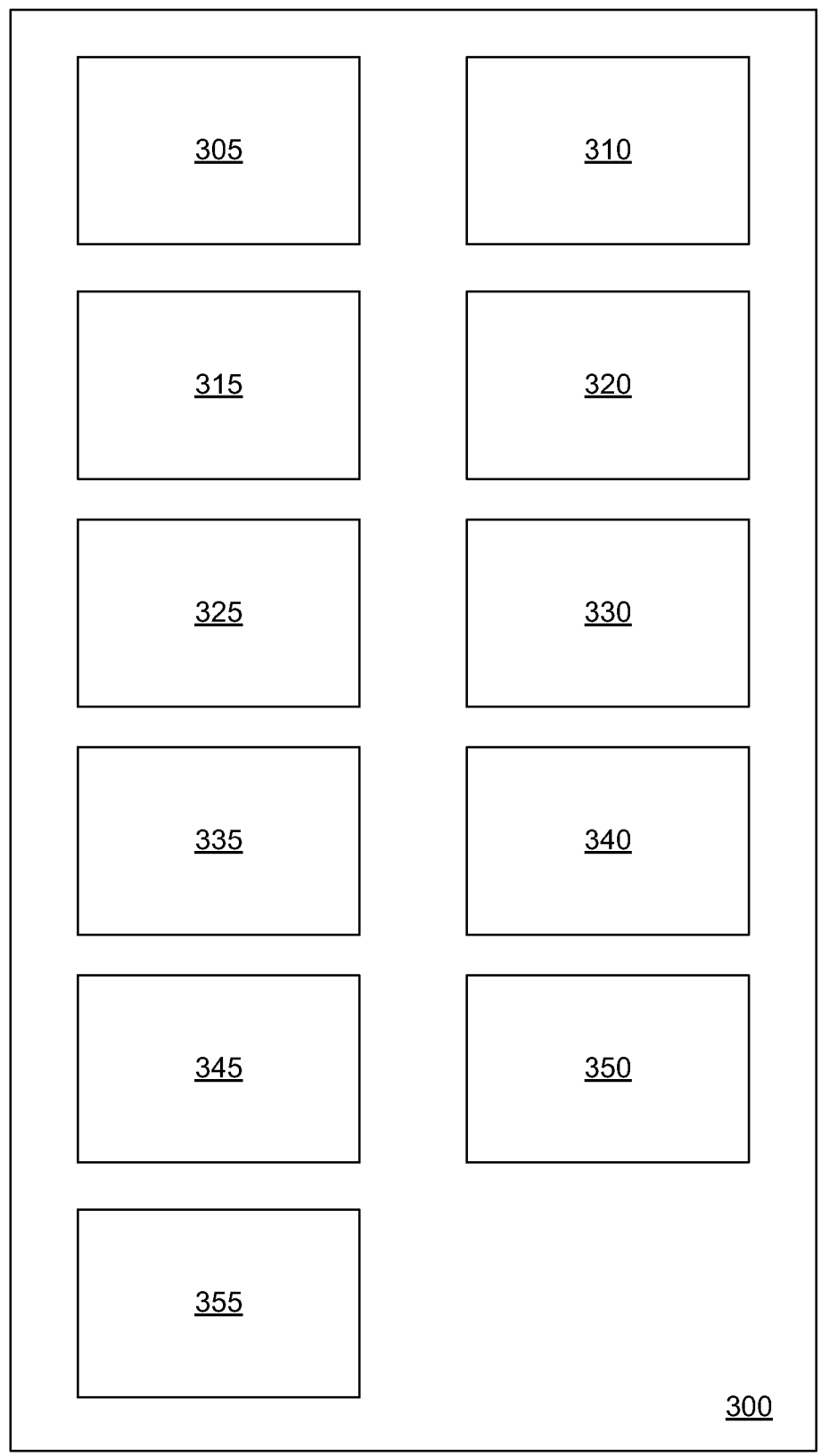
FIG. 3 depicts embodiment theme script rule groups.

FIG. 3 depicts embodiment theme script rule groups 300. A grouping rule, or rules, 305 in an embodiment script file 150 defines the logic by which different user assets 135 are to be grouped into chapters, or sections, of the movie 160; e.g., by content location, date range, the identity of the people appearing in the user assets 135, random, etc. An aspect of this grouping rule(s) 305 also defines the size of the chapters 240 or sections; i.e., how much user content 135 is to be included in any particular chapter 240 and/or how much time each chapter 240 in the movie 160 should play, or run.

An ordering rule, or rules, 310 in an embodiment script file 150 defines the logic by which different user assets 135 are to be ordered within the movie 160; e.g., by ascending or descending time properties, randomly, etc. In an embodiment the ordering rule(s) 310 define the order of user assets 135 for the chapters 240 of the movie 160 and/or the order of user assets 135 within the movie 160.

A selection rule, or rules, 315 in an embodiment script file 150 manages duplicative user assets 135 and the omission of user assets 135 from the resultant movie 160, including the omission of one or more images 105 from a set of images 105 and/or the trimming of user video 115 and/or audio files 125. In an embodiment the omission of user assets 135 from the movie 160 can be for a variety of results including the reduction of duplicative views or sounds within the movie 160, the inclusion of selective content within the movie 160, maintenance of a predefined play time for the movie 160, etc.

An aspect of embodiment selection rule(s) 315 defines, or otherwise determines, how many frames of which user assets 135 are to be included in the movie 160. In an embodiment this aspect of the selection rule(s) 315 defines which, if any, duplicative frames, from a content perspective, of the user assets 135 are to be included in the movie 160. For example, there may be ten (10) images of the same person in the same pose with the same location background in a set of user images 105 and the selection rule(s) 315 define a maximum of two (2) images that depict the same subject matter are to be included in the movie 160. In an embodiment selection rule(s) 315 also define which two of the ten images are to be included in the movie 160, e.g., the first two images in the set of images 105, the two images in the set of images 105 with the face of the depicted person most centered, etc.

A transition rule, or rules, 320 in an embodiment script file 150 defines the transitions to be imposed on the user assets 135 and other elements 155 included in each chapter 240 and the movie 160; e.g., zoom, pan, rotate, fade in, fade out, etc.

An effects rule, or rules, 325 in an embodiment script file 150 defines the effects to be imposed on the user assets 135 and other elements 155 included in the movie 160; e.g., render one or more images 105 black-and-white, render one or more images 105 sepia, mute audio in one or more chapters 240, etc.

An intro rule, or rules, 330 in an embodiment script file 150 defines the information to be used to create an intro section 210 for the movie 160. In an embodiment an intro rule(s) 330 also, or alternatively, defines the information for generating an intro section 210 for one or more chapters 240 of the movie 160. As noted, in an embodiment an intro section 210 is a special section added to the beginning of the movie 160 and/or the beginning of a movie chapter 240. In an embodiment the content of an intro section 210 includes the look, feel and/or audio for each frame of the intro section 210; e.g., black backdrop with white letters and a voice over from frames of a video 115, etc.

In an embodiment the content of an intro section 210 can contain one or more titles, one or more credits, date information, content information, one or more phrases, e.g., lyrics to a song, words from a poem, captions, etc. In an embodiment the content of an intro section 210 can also, or alternatively, be content 155 that is dynamically generated from user content 135.

In an embodiment content of an intro section 210 is automatically generated from existing metadata and/or feature information mined from user assets 135; e.g., titles extracted from image tags, names extracted from image tags, etc. In an embodiment content of an intro section 210 is also, or alternatively, generated from prompted user input when the necessary metadata and/or feature information is unavailable to the movie production system 100. In an embodiment content of an intro section 210 is also, or alternatively, generated from preexisting non-user asset content; e.g., phrases from music lyrics and/or poems, clip art, a music selection, etc.

In an embodiment titles, credits or captions can already exist in one or more frames of an intro section 210 because, e.g., the user 145 has previously caused a movie 160 to be generated from a set of user assets 135 and the user 145 has subsequently changed the theme script 150 to be applied to the same set of user assets 135, the user has previously created titles, credits or captions associated with one or more user assets 135 included in an introduction section 210 or one or more frames of an introduction section 210, etc. In an aspect of this embodiment the text of the existing titles, credits and captions will not be removed or replaced pursuant to theme script rules 175. In an aspect of this embodiment the effect and/or transition applied to the text of the existing titles, credits and captions of the introduction section(s) 210 will be altered as dictated by one or more theme script rules 175 defining the text style for the resultant movie introduction section(s) 210.

An outro rule, or rules, 335 in an embodiment script file 150 defines the information to be used to create an end, or outro, section 230 for the movie 160. In an embodiment an outro rule(s) 335 also, or alternatively, defines the information for generating an end section 230 for each chapter 240 of the movie 160. As noted, in an embodiment an end section 230 is a special section added to the end of the movie 160 and/or the end of one or more movie chapters 240. In an embodiment the content of an end section 230 includes the look, feel and/or audio for each frame of the end section 230; e.g., slow fade out of image frame from user image 105 overlaid with black lettering and enhanced with a musical selection, etc.

In an embodiment the content of an end section 230 can contain one or more titles, one or more credits, date information, content information, one or more phrases, e.g., lyrics to a song, words from a poem, captions, etc. In an embodiment the content of an end section 230 can also, or alternatively, be elements 155 dynamically generated from user content 135; e.g., a collage formed from user assets 135.

In an embodiment content of an end section 230 is automatically generated from existing metadata and/or feature information mined from user assets 135; e.g., credits extracted from image tags, etc. In an embodiment content of an end section 230 is also, or alternatively, generated from prompted user input when the necessary metadata and/or feature information is unavailable to the movie production system 100. In an embodiment content of an end section 230 is also, or alternatively, generated from preexisting non-user asset content; e.g., phrases from music lyrics and/or poems, clip art, a music selection, etc.

In an embodiment titles, credits or captions can already exist in one or more frames of an end section 230 because, e.g., the user 145 has previously caused a movie 160 to be generated from a set of user assets 135 and the user 145 has subsequently changed the theme script 150 to be applied to the same set of user assets 135, the user has previously created titles, credits or captions associated with one or more user assets 135 included in an end section 230 or one or more frames of an end section 230, etc. In an aspect of this embodiment the text of the existing titles, credits and captions will not be removed or replaced pursuant to theme script rules 175. In an aspect of this embodiment the effect and/or transition applied to the text of the existing titles, credits and captions of the end section(s) 230 will be altered as dictated by one or more theme script rules 175 defining the text style for the resultant movie end section(s) 230.

Caption rules 340 in an embodiment script file 150 define how and where captions are to be added to user assets 135 and/or frames of the movie 160. In an embodiment caption rules 340 further contain the details on the style and treatment of various captions included within the movie 160; e.g., font, color, size, position, effect, etc.

In an embodiment caption rules 340 can contain special keywords that are subsequently replaced by appropriate metadata and/or feature information previously mined from the user assets 135. In an embodiment, if the metadata or feature information necessary to personalize a caption is unavailable the caption will be generated with generic text and the user 145 will be prompted to thereafter provide input to replace the generic text and render the movie 160 specific and/or personal.

In an embodiment captions can already exist in one or more frames of the movie 160 because, e.g., the user 145 has previously caused a movie 160 to be generated from a set of user assets 135 and the user 145 has subsequently changed the theme script 150 to be applied to the same set of user assets 135, the user has previously created captions associated with one or more user assets 135 included in the movie 160, etc. In an aspect of this embodiment the text of the existing captions will not be removed or replaced pursuant to theme script rules 175. In an aspect of this embodiment the effect and/or transition applied to the text of the existing captions will be altered as dictated by one or more theme script rules 175 defining the text style for the resultant movie captions. Thus, in an aspect of this embodiment caption text positioning and duration is not guaranteed with the application of a new theme script 150 to the user assets 135 as the new theme script 150 may need to modify these to account for, e.g., animation, theme aesthetics, etc.

An art rule, or rules, 345 in an embodiment script file 150 defines how any included art, e.g., clip art, etc., should be added to, or otherwise, utilized, in the movie 160; e.g., the addition of adornments such as backgrounds or clip art images to one or more movie frames, etc. In an embodiment the art rule(s) 345 details how user assets 135 are to appear with or within added clip art in one or more movie frames; e.g., a scrapbook page with user asset images 105 positioned within clip art frames, etc.

In an embodiment one or more theme scripts 150 identify one or more music scores, via a music rule, or rules, 350 to be included within the movie 160. In an aspect of this embodiment the identified music score(s) are intended to enhance the theme, or mood, of the chosen script file 150 and, therefore, the resultant movie 160. In an embodiment the music rules 350 include directions for the positioning of the music within the movie 160 and the treatment, e.g., volume, and effects, e.g., fade in, fade out, loop, etc., to be imposed on the included music.

In an embodiment the music rules 350 also, or alternatively, dictate how a user's audio 120 is to be managed within the movie 160; e.g., played with specific chapters and muted for others, softened and played throughout the body 220 of the movie 160, played in the introduction 210 and end 230 sections of the movie 160, etc.

In an embodiment if there is user-specified music already associated with one or more user assets 135 or one or more frames of the movie 160 then the user 145 is asked to indicate whether they wish to retain the user-specified music or utilize the theme script identified music. In an alternative embodiment if there is user-specified music associated with one or more user assets 135 or one or more frames of the movie 160 then the user 145 is notified that the user-specified music will not be implemented and the theme script identified music is included within the movie 160 pursuant to one or more music rules 350. In a second alternative embodiment if there is user-specified music associated with one or more user assets 135 or one or more frames of the movie 160 then the user-specified music is retained and used for the movie 160.

In an embodiment if there is no music associated with the user assets 135 or frames of the movie 160 then the user 145 is prompted, via the UI 180, to select, or otherwise identify, a music selection, or selections, to be included within the movie 160. In an alternative embodiment if there is no music associated with the user assets 135 or frames of the movie 160 then pre-identified music indicated in one or more theme script rules 175 is used for the movie 160.

In an embodiment a dynamic frame generation rule(s) 355 in a script file 150 defines how elements 155, or frames, are to be dynamically created for incorporation within the movie 160. Dynamically generated elements 155 can include, but are not limited to, frame background designs, scrapbook pages, collages, additional images generated from still frames of a user asset video 115, additional images generated from differing regions of a user asset image 105, etc. For example, a dynamic frame generation rule(s) 355 can define the creation of a scrapbook page frame with user images 105 arranged about the frame and decorated with pre-selected clipart to be included within the movie 160. As a second example, a dynamic frame generation rule(s) 355 can define the generation of two images from one user asset image 105 where each of the two generated images depict differing regions, or subjects, e.g., different people, etc., within the user asset image 105. In an aspect of this embodiment mined metadata and feature information and/or the results of analyses performed on the original user asset 135 is used in conjunction with, or by, the dynamic frame generation rule(s) 355 to dynamically generate elements 155 for the movie 160 from existing user assets 135.

In an embodiment dynamically generated elements 155 created pursuant to one or more dynamic frame generation rules 355 are stored in one or more movie asset databases 195. In other embodiments dynamically generated elements 155 are stored and referenced by one or more of a variety of storage constructs, including but not limited to, movie asset databases 195, tables, lists, linked lists, etc.

In an embodiment a dynamic frame generation rule(s) 355 controls the placement of dynamically generated elements 155 within the movie 160; e.g., first frame in the intro section 210, etc. In an embodiment a dynamic frame generation rule(s) 355 defines the transitions and effects to be implemented for dynamically generated elements 155. In an aspect of this embodiment the transitions and effects identified by a dynamic frame generation rule 355 supersedes any transition rules 320 or effects rules 235 in the script file 150 that would otherwise be implemented for the dynamically generated element 155 due to, e.g., its position within the movie 160.

In embodiments more, less and/or alternative groups 300 of theme script rules 175 exist.

Referring again to FIG. 1, in an embodiment a user 145 interacts with the movie production system 100 via a user interface, UI, 180. In an embodiment the user 145 enables user content 135 to be input, or otherwise made accessible, to the computing system, or device, e.g., personal computer, computer network, etc. hosting, or otherwise running, the movie production system 100. In an embodiment the theme application engine 120, via the UI 180, prompts the user 145 for input to render the movie 160 more polished and personal. In an embodiment the UI outputs the movie 160 to the user 145 for review. In an embodiment the user 145 can make changes to the movie 160 via the UI 180.

In an embodiment, while the movie production system 100 is generating a movie 160 a progress dialog box is displayed to the user 145 via the UI 180. In an embodiment the progress dialog box indicates the action currently being performed to generate the movie 160; e.g., applying black-and-white movie theme, generating intro section, etc. In an embodiment the progress dialog box indicates how much of the movie generation has been completed; e.g., 60% complete, etc.

In an embodiment a progress dialog box is displayed to a user 145 only when the movie production system 100 requires a user perceptible time to apply the rules 175 of a theme script 150 to generate a movie 160

In an embodiment the user 145 can, via the UI 180, inform the movie production system 100 that the movie 160 is finished and/or ready for publication. In an embodiment the movie production system 100 encodes a finished movie 160 in one or more predefined formats and/or one or more user-specified formats and/or one or more formats supported by a storage media associated with the movie production system 100 and upon which the finished movie 160 will be stored and/or pushed to and/or published to. In an embodiment there can be more than one copy of a finished, encoded movie 190, also referred to herein as the published movie 190. In an embodiment the movie production system 100 stores each encoded version of the finished movie 190 to one or more storage media, e.g., hard drive, computer memory, DVD, CD, memory stick, etc.

In an embodiment the movie production system 100 can publish a finished, encoded version of the movie 190 by pushing, or otherwise storing, the published movie 190 to one or more devices or media 185, e.g., computer, cell phone, etc. In an embodiment the movie production system 100 can publish a finished, encoded version of the movie 190 to one or more publication points 165, e.g., websites, email addresses, etc.

Figure 4A:
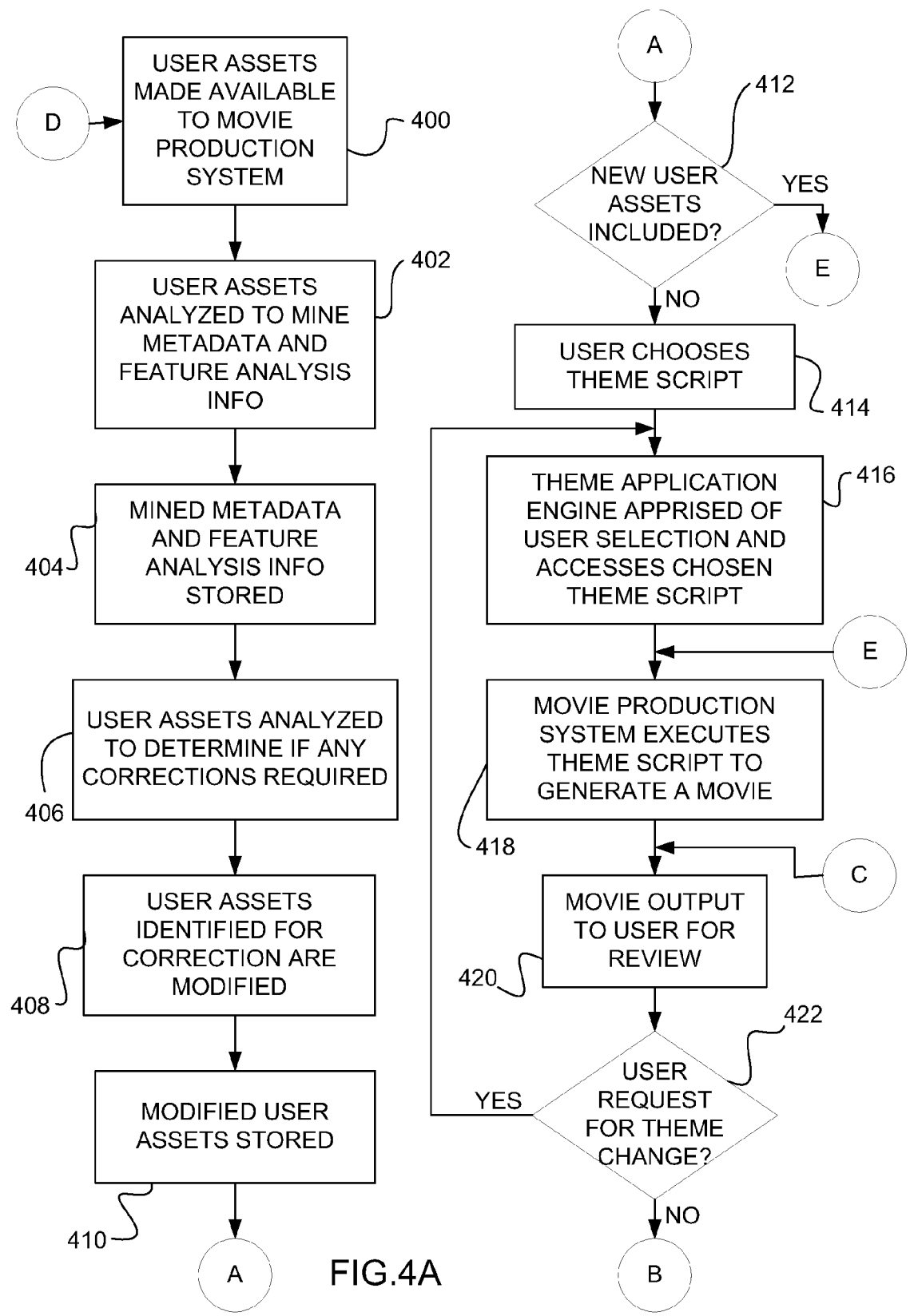
FIGS. 4A-4B illustrate an embodiment logic flow for an embodiment movie production system.
Figure 4B:
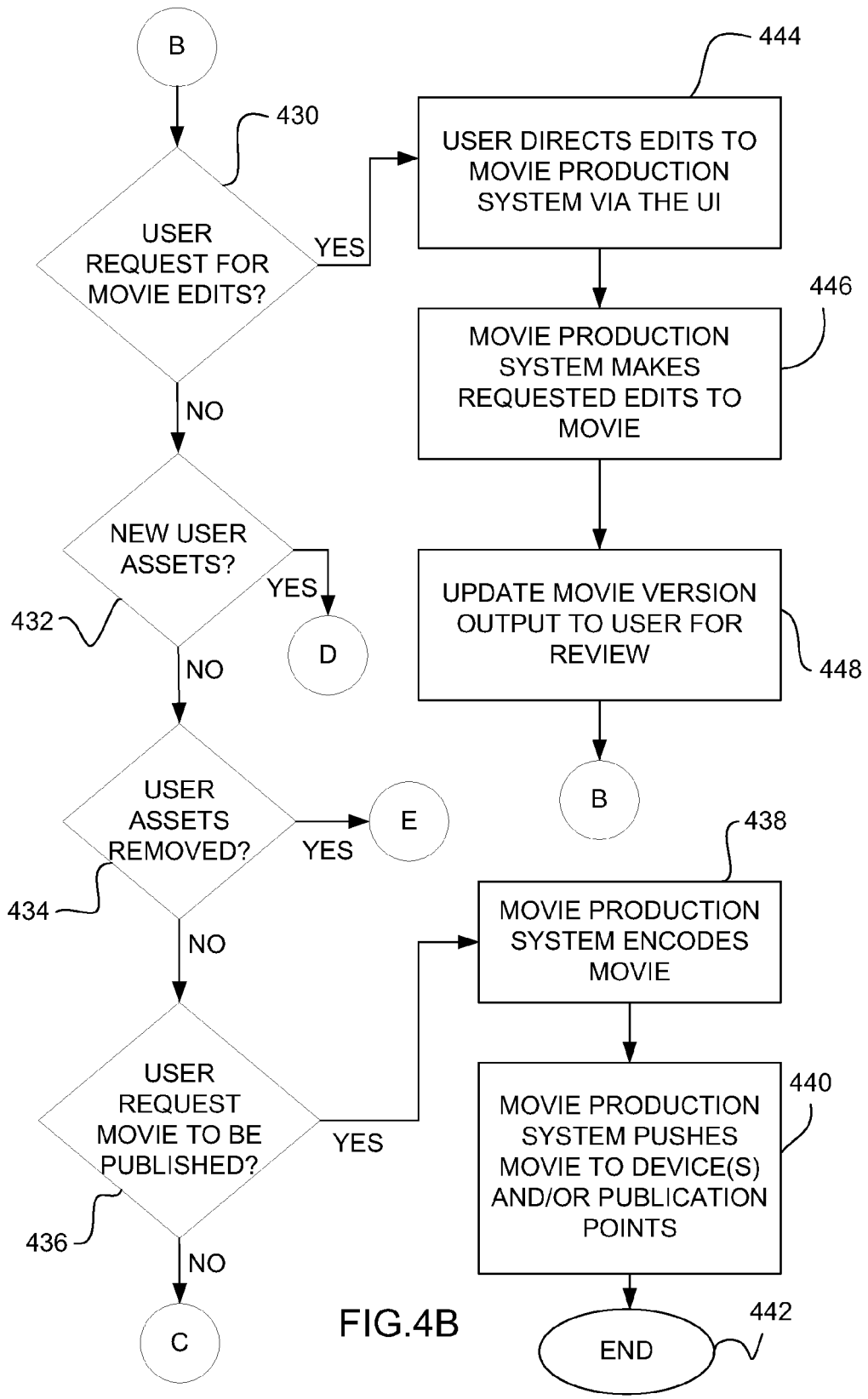

FIGS. 4A-4B illustrate an embodiment logic flow for an embodiment movie production system 100. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment movie production system 100 or by an embodiment movie production system 100 in combination with one or more other systems.

Referring to FIG. 4A, in an embodiment user assets are introduced, or otherwise made available to, the movie production system 400.

In an embodiment the movie production system analyzes the user assets to mine metadata and feature information 402. In an embodiment the movie production system stores metadata and feature information collected from user assets in one or more metadata databases 404. In an aspect of these embodiments the analysis engine 110 of the movie production system 100 has the capability to analyze the user assets 135 to mine metadata and feature information and to store the mined data and information in one or more metadata databases 130. In alternative aspects of these embodiments the analysis engine 110 stores mined metadata and feature information which is referenced by one or more of a variety of storage constructs, including but not limited to, metadata databases 195, tables, lists, linked lists, etc.

In an embodiment the movie production system analyzes the user assets to identify user assets or user asset portions, i.e., frames or segments, to be modified, e.g., to correct red-eye, etc., 406. In an aspect of this embodiment the analysis engine 110 of the movie production system 100 has the capability to analyze user assets 135 to identify those user assets 135, or portions of user assets 135, to be modified or corrected. In this aspect of this embodiment the analysis engine 110 notifies the adaptation engine 140 of the movie production system 100 to modify the user assets 135 so identified.

In an embodiment the movie production system makes any identified modifications and corrections to indicated user assets 408. In an embodiment the modified user assets are stored 410. In an aspect of these embodiments the adaptation engine 140 of the movie production system 100 has the capability to make the modifications and corrections to the identified user assets 135, or portions thereof, and to store the resultant modified user assets.

In an embodiment, at decision block 412 a determination is made as to whether new user assets have been included by the user after a prior movie version has already been generated for review. If no, in an embodiment the user, via the UI of the movie production system, chooses a theme script to be applied to the user assets, or a user-identified subset of the user assets, 414. In an embodiment the theme application engine of the movie production system is apprised of the user selection and accesses the chosen script file 416.

In an embodiment the movie production system executes, or otherwise acts upon, the chosen script file to generate a story, e.g., a movie, 418. In an aspect of this embodiment the theme application engine 120 of the movie production system 100 has the capability to execute the user-chosen script file 150 to generate a movie 160. In an aspect of this embodiment the theme application engine 120 applies rules 175 of the user-chosen script file 150 to one or more user assets 135, one or more modified user assets and/or one or more generated elements 155. Additional details for this embodiment step 418 are described with reference to FIGS. 5A-5E.

In an embodiment the generated story, e.g., movie, is output to the user for review 420. In an aspect of this embodiment the theme application engine 120 of the movie maker system 100 directs the output of the movie 160 to the user 145 via the UI 180. In an embodiment the movie 160 is in a WYSIWYG (what-you-see-is-what-you-get) format appropriate for user review.

In an embodiment at decision block 422 a determination is made as to whether the user has made a theme change request. If yes, in an embodiment the theme application engine of the movie production system is apprised of the user selection and accesses the newly chosen script file 416.

Referring to FIG. 4B, at decision block 430 a determination is made as to whether the user has requested any edits to the movie. In an embodiment a user 145 can override one or more theme script rules 175 and/or add additional elements or content, e.g., transitions or effects not accounted for by the theme script 150, to the movie 160 by requesting edits to the movie 160 via the UI 180. For example the user 145 can choose different transitions and/or effects, add pan and/zoom to one or more images, change captions, titles or credit styles, change font settings, add or remove music, add or delete user assets 135 to be included in the movie 160, etc.

In an embodiment if the user wishes to edit the movie then the user inputs their edit requests to the movie production system 444. In an aspect of this embodiment the user 145 directs their edits to the theme application engine 120 of the movie production system In an embodiment the newest version of the movie, with user-requested edits implemented, is output to the user for review 448. In an aspect of this embodiment the theme application engine 120 of the movie maker system 100 directs the output of the movie 160 to the user 145 via the UI 180. In an embodiment the movie 160 is in a WYSIWYG format appropriate for user review.

In an embodiment the movie maker system again, at decision block 430, makes a determination as to whether the user is requesting any edits to the movie.

If at decision block 430 there are no user-requested movie edits then in an embodiment at decision block 432 a determination is made as to whether the user has introduced new assets to the movie production system for inclusion in a generated movie. If yes, in an embodiment, and referring back to FIG. 4A, the new user assets are made available to the movie production system 400 and processed as prior introduced user assets were.

Referring again to FIG. 4B if at decision block 432 there are no new user assets to be included in a generated movie then in an embodiment at decision block 434 a determination is made as to whether any user assets have been removed by the user for use in generating a movie. If yes, in an embodiment and referring back to FIG. 4A, the movie production system executes the user-chosen theme script to regenerate, or otherwise modify, the movie without the previously included user assets 418.

Referring again to FIG. 4B if at decision block 434 no user assets have been excluded for use in generating a movie then in an embodiment at decision block 436 a determination is made as to whether the user has requested the movie be published. If no, in an embodiment and referring back to FIG. 4A, the movie maker system continues to output the movie to the user or otherwise make the movie available to the user for review 420.

If at decision block 436 the user has commanded the movie be published then in an embodiment the movie production system encodes the movie into one or more appropriate output formats 438. In an embodiment the movie production system stores the encoded movie 438. In an alternative embodiment, if at decision block 426 the user has commanded the movie be published then in an embodiment the movie production system stores the finished movie 438. In an alternative embodiment the movie production system thereafter encodes the finished movie into one or more versions of the finished movie pursuant to requirements for the encoded movie's destination 438.

In an embodiment the movie production system can publish, or push, a finished, encoded version of the movie on to one or more indicated computing devices or media 440. In an embodiment the movie production system can publish a finished, encoded version of the movie to one or more publication points 440.

In an embodiment the movie production system thereafter ends processing for the current movie 442.

FIGS. 5A-5E illustrate an embodiment logic flow for an embodiment movie production system 100 to execute, or otherwise run or act upon, a user-chosen theme script 150 to create a movie 160; i.e., an embodiment logic flow for the movie production system execution of a theme script to generate a movie 418 of FIG. 4A. While the following discussion is made with respect to systems portrayed herein the operations described may be implemented in other systems. The operations described herein are not limited to the order shown. Additionally, in other alternative embodiments more or fewer operations may be performed. In any embodiment not all steps need be performed for each script file 150 and/or the steps may be performed in a different order for different script files 150. Further, the operations depicted may be preformed by an embodiment movie production system 100 or by an embodiment movie production system 100 in combination with one or more other systems.

Figure 5A:
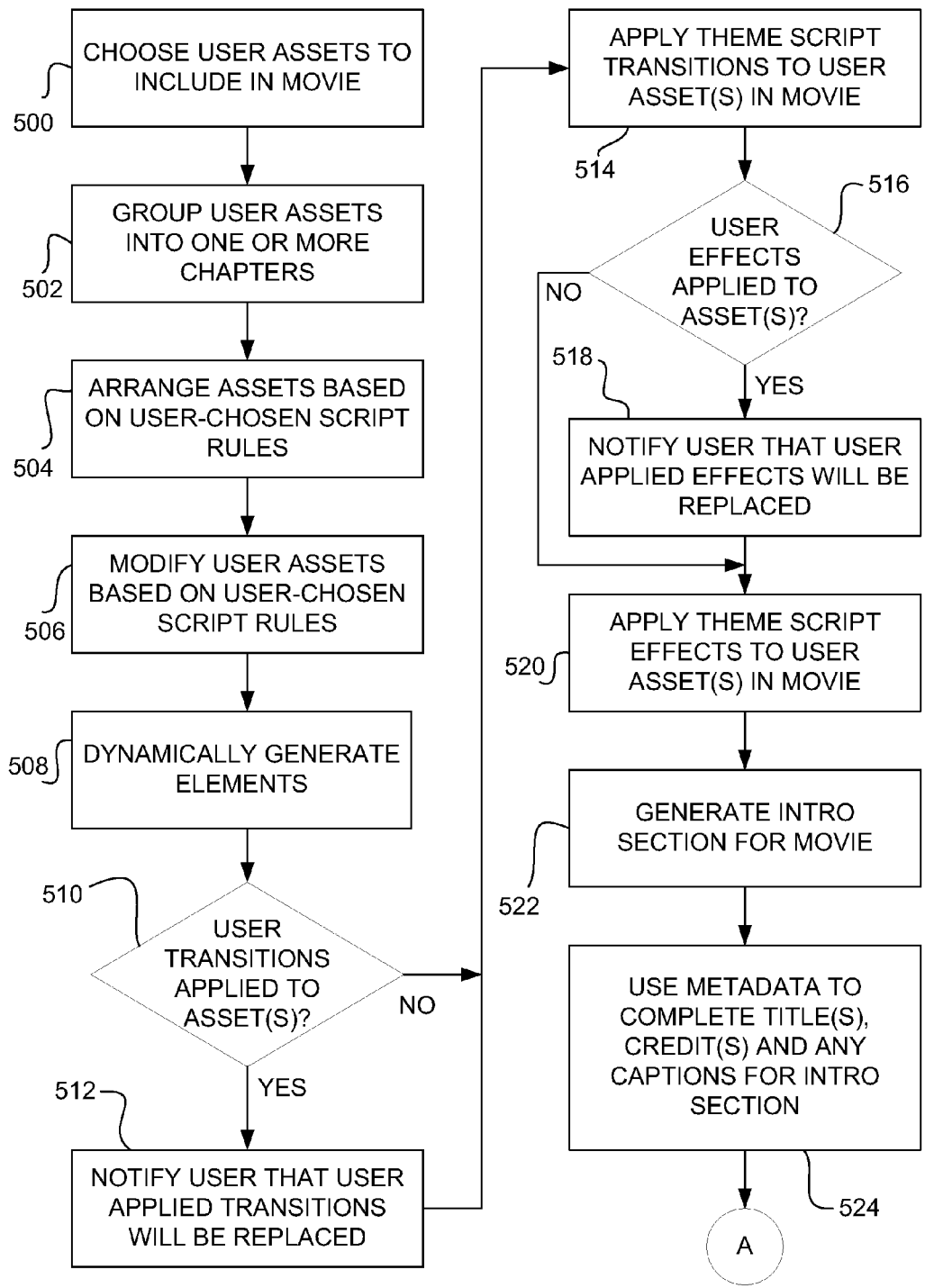
FIGS. 5A-5E illustrate an embodiment logic flow for an embodiment movie production system to execute a user-chosen theme script to generate a story.

Referring to FIG. 5A, in an embodiment user assets are chosen, or otherwise identified, to be included in the story, or movie, 500.

In an embodiment, pursuant to one or more theme script rules of the user chosen script file the user assets, or a subset thereof, are grouped into one or more chapters for a resultant movie 502. In an aspect of this embodiment the theme application engine 120 organizes the user assets 135, or a subset thereof, into one or more movie chapters 240. In an aspect of this embodiment, pursuant to one or more script file rules 175, the theme application engine 120 accesses the asset database(s) 170 to include modified user assets in the generated movie 160 and accesses the user assets for those user assets to be included in the generated movie 160 that have not, as yet, been modified. In an aspect of this embodiment the theme application engine 120 chooses the user assets, or modified user assets, for each chapter 240 based on the available user assets 135, and modified user assets, mined metadata and feature information and/or keywords identified in the user-chosen script file 150, e.g., SinglePersonShot, GroupShot, CloseUp, etc.

In an embodiment, pursuant to one or more theme script rules of the user-chosen script file, the user assets are arranged and/or ordered within the movie 504. In an aspect of this embodiment, pursuant to one or more script file rules 175, the theme application engine 120 arranges and/or orders the user assets 135, and/or modified user assets stored in an asset database 170, within the various movie chapters 240; e.g., orders the user assets 135 from the first to be displayed to the last to be displayed for a first chapter 240 of the movie 160, etc.

In an embodiment, pursuant to one or more theme script rules, one or more user assets are modified 506. In an aspect of this embodiment, pursuant to one or more theme script rules 175, the theme application engine 120 signals, or otherwise directs, the adaptation engine 140 to transpose, or modify, one or more user assets 135 to be included in the movie 160. For example, in an aspect of this embodiment and pursuant to one or more theme script rules 175, the theme application engine 120 directs the adaptation engine 140 to transpose selected images 105 to black-and-white.

As another example, in an aspect of this embodiment and pursuant to one to more theme script rules 175 as well as the length of a user video 115, how many other user assets 135 are to be included in the generated movie 160, how much the user video changes over x time and/or etc., the theme application engine 120 can direct the adaptation engine 140 to trim a user asset video 115. In an embodiment a video clip 115 may be trimmed to highlight what is deemed the interesting sections of the video clip 115. In an embodiment the selection of the segments of the video clip 115 to retain, and those segments to trim, is based on keywords in one or more rules 175 of the script file 150 and can be facilitated by stored feature information. Thus, in an embodiment the segments of a video clip 115 that are retained for a movie 160 can vary from script theme 150 to script theme 150 based on the keywords designated in any particular script file 150.

In an embodiment, pursuant to one or more theme script rules of the user-chosen script file, one or more elements to be included in the movie are dynamically generated 508. In an aspect of this embodiment, pursuant to one or more rules 175 of the user-chosen script file 150, the theme application engine 120 dynamically generates elements 155 to be included in the movie 160 using user assets 135 or modified user assets. For example, in an embodiment and pursuant to one or more theme script rules 175, the theme application engine 120 dynamically generates one or more frames for the movie 160 that resemble a scrapbook with images 105 applied thereto and decorated with clip art. In an embodiment the selection of the user assets 135 and/or portions of the user assets 135 included in a dynamically generated element 155 are based on keywords in one or more script rules 175 and/or stored metadata and/or feature information.

In an embodiment dynamically generated elements are stored 508. In an aspect of this embodiment the theme application engine 120 stores the elements 155 it dynamically generates in one or more movie asset databases 195. In other aspects of this embodiment the theme application engine 120 stores the elements 155 it dynamically generates and references the stored elements 155 using one or more of a variety of storage constructs, including but not limited to, movie asset databases 195, tables, lists, linked lists, etc.

In an embodiment, pursuant to one or more rules of the user-chosen script file the dynamically generated elements are arranged, or ordered, within the movie 508.

In an embodiment at decision block 510 a determination is made as to whether user transitions have been applied to one or more user assets to be included in the movie; i.e., has the user already applied one or more transitions to one or more user assets. If yes, in an embodiment the movie production system notifies the user that the user applied transitions will be replaced with theme script identified transitions 512.

Whether or not the user has previously applied any transitions to any user assets, or group of user assets, included in the movie in an embodiment, pursuant to one or more rules of the user-chosen script file, one or more transitions are applied to one or more user assets, or groups of user assets, and/or one or more dynamically generated elements included in the movie 514. In an aspect of this embodiment pursuant to one or more rules 175 of the user-chosen script file 150 the theme application engine 120 applies rule-specified transitions to one or more user assets 135, groups of user assets 135, and/or dynamically generated elements 155 included in the movie 160. In an alternative aspect of this embodiment the theme application engine 120 signals, or otherwise commands, the adaptation engine 140 to apply rule-specified transitions to one or more user assets 135, groups of user assets 135, and/or dynamically generated elements 155 included in the movie 160.

In an aspect of this embodiment some transition applications 514 require information about the user asset(s) a transition is to be applied to, e.g., the portion of an image 105 that the transition is to begin the fade out on. In this aspect of this embodiment the movie production system 100 uses stored metadata, feature and/or analysis information to finalize the application of a rule-specified transition to one or more user assets 135 and/or one or more dynamically generated elements 155.

In an embodiment at decision block 516 a determination is made as to whether user effects have been applied to one or more user assets to be included in the movie; i.e., has the user already applied one or more effects to one or more user assets. If yes, in an embodiment the movie production system notifies the user that the user applied effects will be replaced with theme script identified effects 518.

Whether or not the user has previously applied any effects to any user assets, or group of user assets, included in the movie in an embodiment, pursuant to one or more rules of the user-chosen script file, one or more effects are applied to one or more user assets, groups of user assets, and/or one or more dynamically generated elements included in the movie 520. In an aspect of this embodiment, pursuant to one or more rules 175 of the user-chosen script file 150, the theme application engine 120 applies rule-specified effects to one or more user assets 135, groups of user assets 135, and/or dynamically generated elements 155 included in the movie 160. In an alternative aspect of this embodiment the theme application engine 120 signals, or otherwise commands, the adaptation engine 140 to apply rule-specified effects to one or more user assets 135, groups of user assets 135, and/or dynamically generated elements 155 included in the movie 160.

In an aspect of this embodiment some effect applications 520 require information about the user asset an effect is to be applied to, e.g., the area of interest in an image 105 where the effect is to zoom in on. In this aspect of this embodiment the movie production system 100 uses stored metadata, feature and/or analysis information to finalize the application of a rule-specified effect to one or more user assets 135 and/or one or more dynamically generated elements 155.

In an embodiment, pursuant to one or more theme script rules of the user-chosen script file an intro section for the movie is generated 522. In an aspect of this embodiment the theme application engine 120 applies one or more script rules 175 to generate an intro section 210 for the movie 160. In an embodiment an intro section 210 is generated by the theme application engine 120 giving special treatment, e.g., transition and/or effects application, title and/or caption inclusion, etc., to the first, or selected first group of, movie frames which may include one or more user assets 135 and/or one or more dynamically generated elements 155.

In an embodiment the theme application engine 120, pursuant to one or more script rules 175, adds title information, credit information, captions and/or other text information into one or more frames of the movie's intro section 210. In an embodiment the movie production system uses metadata from one or more metadata databases to complete the title(s), credit(s), caption(s) and/or other text within the intro section of the movie 524.

Figure 5B:
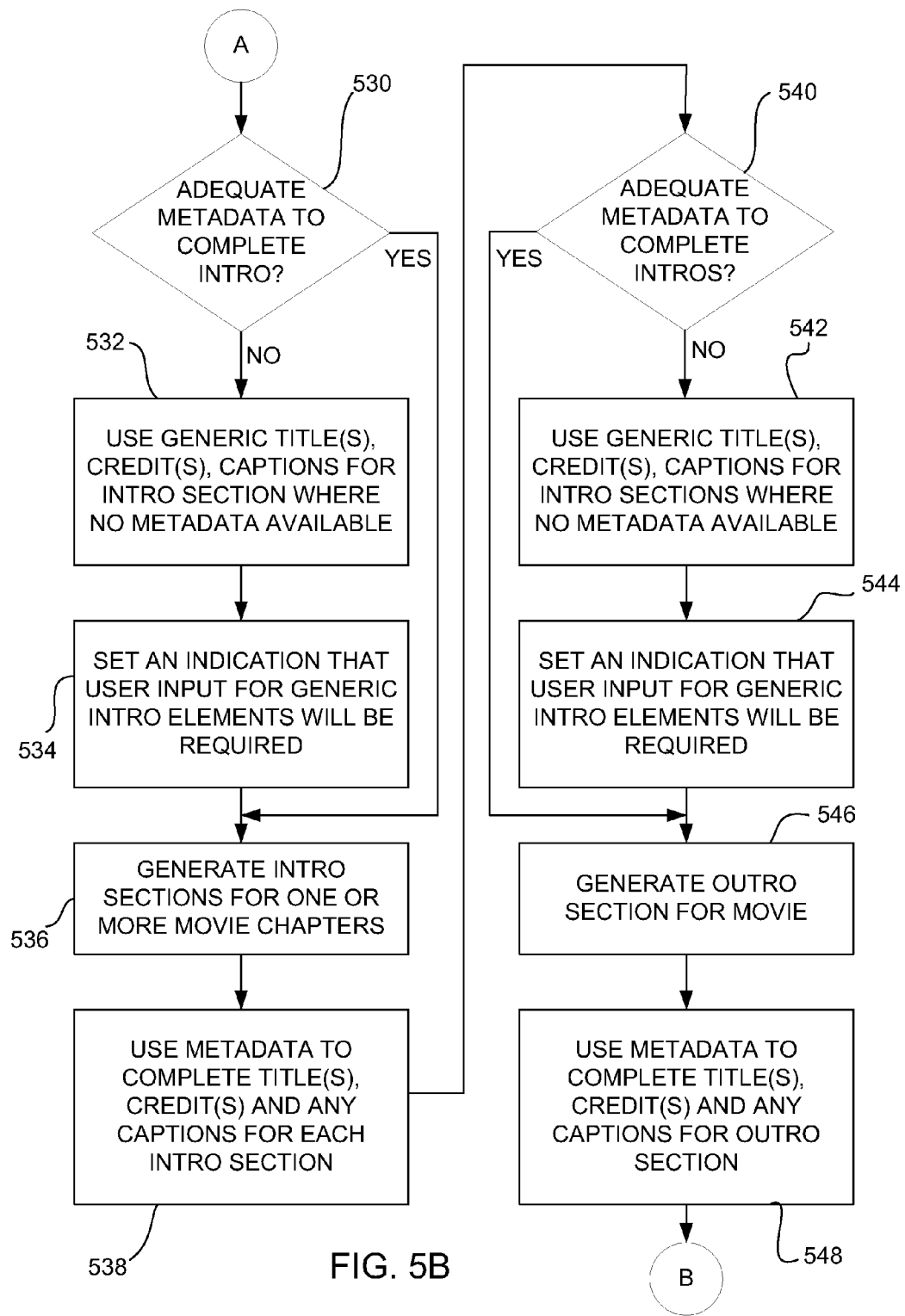

Referring to FIG. 5B, in an embodiment at decision block 530 a determination is made as to whether there is adequate metadata to complete the intro section of the movie. If no, in an embodiment the movie production system uses generic title(s), generic credit(s) and/or generic caption(s) and/or other generic text in place of user asset specific information within the intro section of the movie for those titles, credits, captions and other intro section text for which there is insufficient metadata 532. In an embodiment the movie production system sets an indication, e.g., a flag, a counter, etc., as a notification that user input for generic text within the intro section of the movie is to be requested 534.

Whether or not there is sufficient metadata to complete the text portions of the intro section of the movie in an embodiment, pursuant to one or more theme script rules of the user-chosen script file, an intro section for one or more chapters of the movie is generated 536. In an aspect of this embodiment the theme application engine 120 applies one or more script rules 175 to generate an intro section 210 for one or more movie chapters 240. In an embodiment an intro section 210 is generated by the theme application engine 120 giving special treatment, e.g., transition and/or effects application, title and/or caption inclusion, etc., to the first, or selected first group, of movie frames of each chapter 240 which may include one or more user assets 135 and/or one or more dynamically generated elements 155.

In an embodiment the theme application engine 120, pursuant to one or more script rules 175, adds title information, credit information and/or other text information into one or more frames of the intro section 210 for one or more movie chapters 240. In an embodiment the movie production system uses metadata from one or more metadata databases to complete the title(s), credit(s) and any caption and/or other text within the intro section of the chapters of the movie 538.

In an embodiment at decision block 540 a determination is made as to whether there is adequate metadata to complete the intro section for the chapters of the movie. If no, in an embodiment the movie production system uses generic title(s), generic credit(s) and/or generic caption(s) and/or other generic text in place of user asset specific information within the intro section of the movie chapters for those titles, credits, captions and other intro section text for which there is insufficient metadata 542. In an embodiment the movie production system sets an indication, e.g., a flag, a counter, etc., as a notification that user input for generic text within the one or more intro sections of one or more movie chapters is to be requested 544.

In an embodiment, pursuant to one or more theme script rules of the user-chosen script file, an outro section for the movie is generated 546. In an aspect of this embodiment the theme application engine 120 applies one or more script rules 175 to generate an outro section 230 for the movie 160. In an embodiment an outro section 230 is generated by the theme application engine 120 giving special treatment, e.g., transition and/or effects application, title and/or caption inclusion, etc., to the last, or last group of, movie frames which may include one or more user assets 135 and/or one or more dynamically generated elements 155.

In an embodiment the theme application engine 120, pursuant to one or more script rules 175, adds title information, credit information, captions and/or other text information into one or more frames of the movie's outro section 230. In an embodiment the movie production system uses metadata from one or more metadata databases to complete the title(s), credit(s), caption(s) and/or other text within the outro section of the movie 548.

Figure 5C:
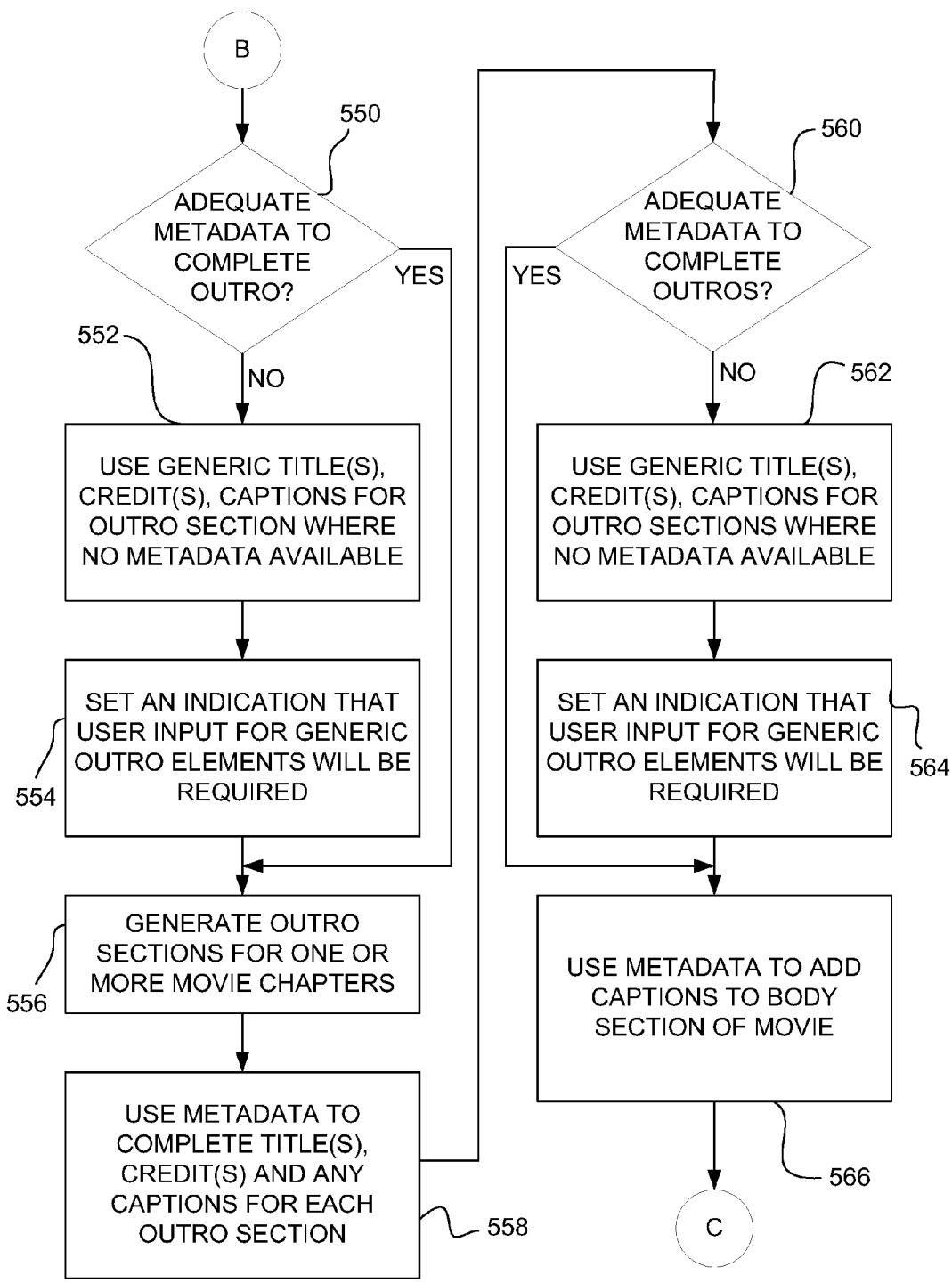

Referring to FIG. 5C, in an embodiment at decision block 550 a determination is made as to whether there is adequate metadata to complete the outro section of the movie. If no, in an embodiment the movie production system uses generic title(s), generic credit(s) and/or generic caption(s) and/or other generic text in place of user asset specific information within the outro section of the movie for those titles, credits, captions and other outro section text for which there is insufficient metadata 552. In an embodiment the movie production system sets an indication, e.g., a flag, a counter, etc., as a notification that user input for generic text within the outro section of the movie is to be requested 554.

Whether or not there is sufficient metadata to complete the text portions of the outro section of the movie, in an embodiment, pursuant to one or more theme script rules of the user-chosen script file, an outro section for one or more chapters of the movie is generated 556. In an aspect of this embodiment the theme application engine 120 applies one or more script rules 175 to generate an outro section 230 for one or more movie chapters 240. In an embodiment an outro section 230 is generated by the theme application engine 120 giving special treatment, e.g., transition and/or effects application, title and/or caption inclusion, etc., to the last, or last group of, movie frames of a chapter 240 which may include one or more user assets 135 and/or one or more dynamically generated elements 155.

In an embodiment the theme application engine 120, pursuant to one or more script rules 175, adds title information, credit information and/or other text information into one or more frames of the outro section 230 for one or more chapters 240 of the movie 160. In an embodiment the movie production system uses metadata from one or more metadata databases to complete the title(s), credit(s), caption(s) and/or other text within the outro section of the chapters of the movie 558.

In an embodiment at decision block 560 a determination is made as to whether there is adequate metadata to complete the outro sections for the chapters of the movie. If no, in an embodiment the movie production system uses generic title(s), generic credit(s) and/or generic caption(s) and/or other generic text in place of user asset specific information within the outro section of the movie chapters for those titles, credits, captions and other outro section text for which there is insufficient metadata 562. In an embodiment the movie production system sets an indication, e.g., a flag, a counter, etc., as a notification that user input for generic text within the one or more outro sections of one or more movie chapters is to be requested 564.

In an embodiment, pursuant to one or more theme script rules of the user-chosen script file, one or more captions are added to the body section of the movie 566. In an aspect of this embodiment the theme application engine 120 applies one or more script rules 175 to generate one or more captions 230 for one or more movie frames in the body section 220 of the movie 160. In an embodiment the movie production system uses metadata from one or more metadata databases to complete the captions 566.

Figure 5D:
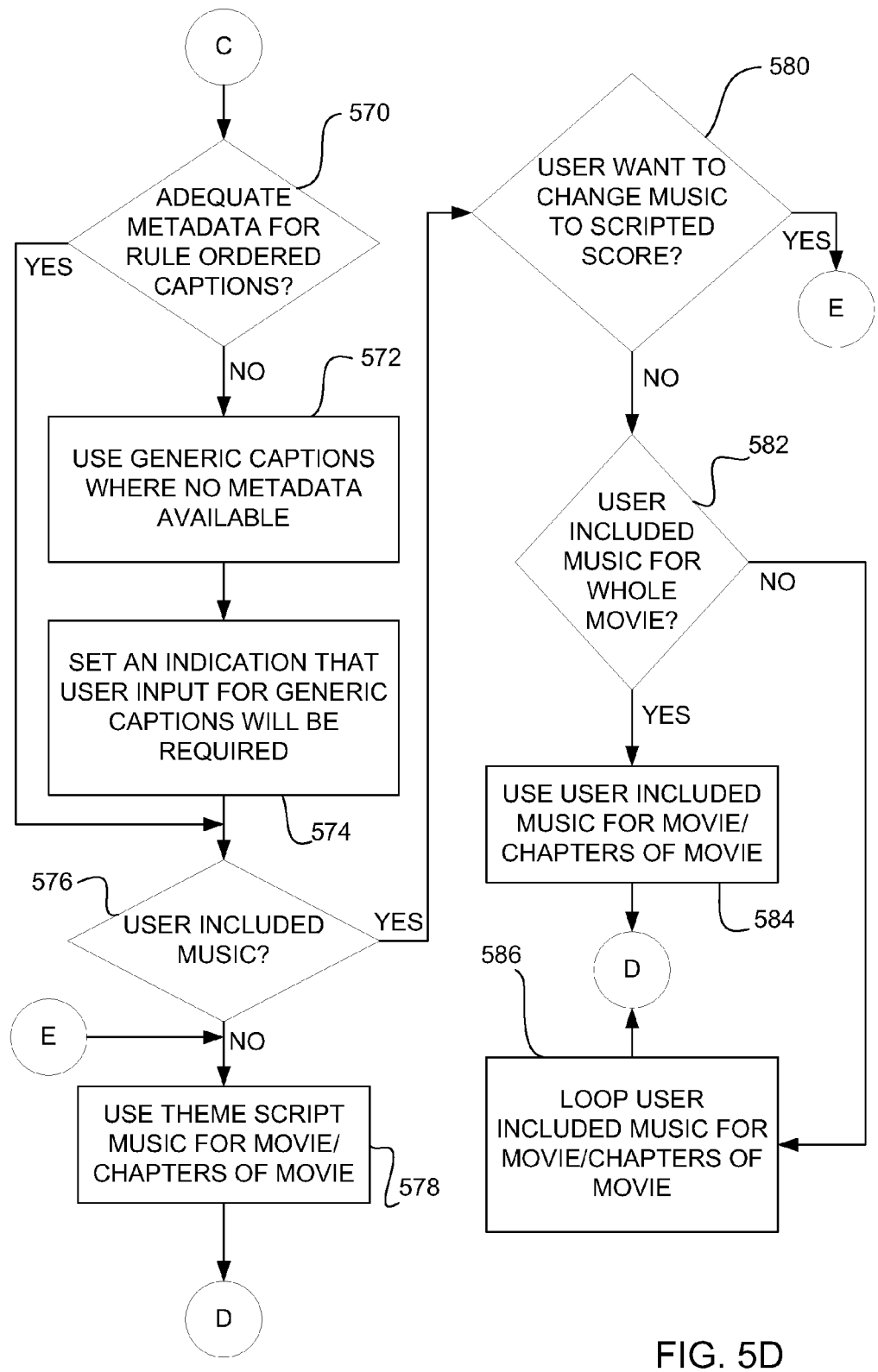

Referring to FIG. 5D, in an embodiment at decision block 570 a determination is made as to whether there is adequate metadata to complete the captions for the body of the movie. If no, in an embodiment the movie production system uses generic captions in place of user asset specific information for those captions for which there is insufficient metadata 572. In an embodiment the movie production system sets an indication, e.g., a flag, a counter, etc., as a notification that user input for generic captions within the body section of the movie is to be requested 574.

Whether or not there is sufficient metadata to personalize the captions in the movie's body, in an embodiment at decision block 576 a determination is made as to whether there is user included music for the movie. If no, in an embodiment theme script identified music is incorporated within the movie as dictated by one or more theme script rules 578.

If there is user included music for the movie, in an embodiment at decision block 580 a determination is made as to whether the user wants to change the music to the theme script identified music. In an aspect of this embodiment the user 145 is asked, via the UI 180, whether the movie production system should use the user included music or theme script identified music for the generated movie 160.

If the user indicates the theme script identified music should be incorporated within the movie then in an embodiment the theme script identified music is added to the movie as dictated by one or more theme script rules 578.

If the user indicates the user included music should be incorporated within the movie then in an embodiment at decision block 582 a determination is made as to whether there is sufficient user included music for the entire generated movie. If yes, in an embodiment the movie production system applies the user included music to the generated movie 584. If, however, there is insufficient user included music for the entire generated movie then in an embodiment the movie production system loops the user included music as dictated by one or more theme script rules for the user included music to be applied to the generated movie 586. In an alternate embodiment if there is insufficient user included music for the entire generated movie then the movie production system applies user included music for the portions of the movie where user included music is available and applies theme script identified music for other portions of the generated movie 586.

Figure 5E:
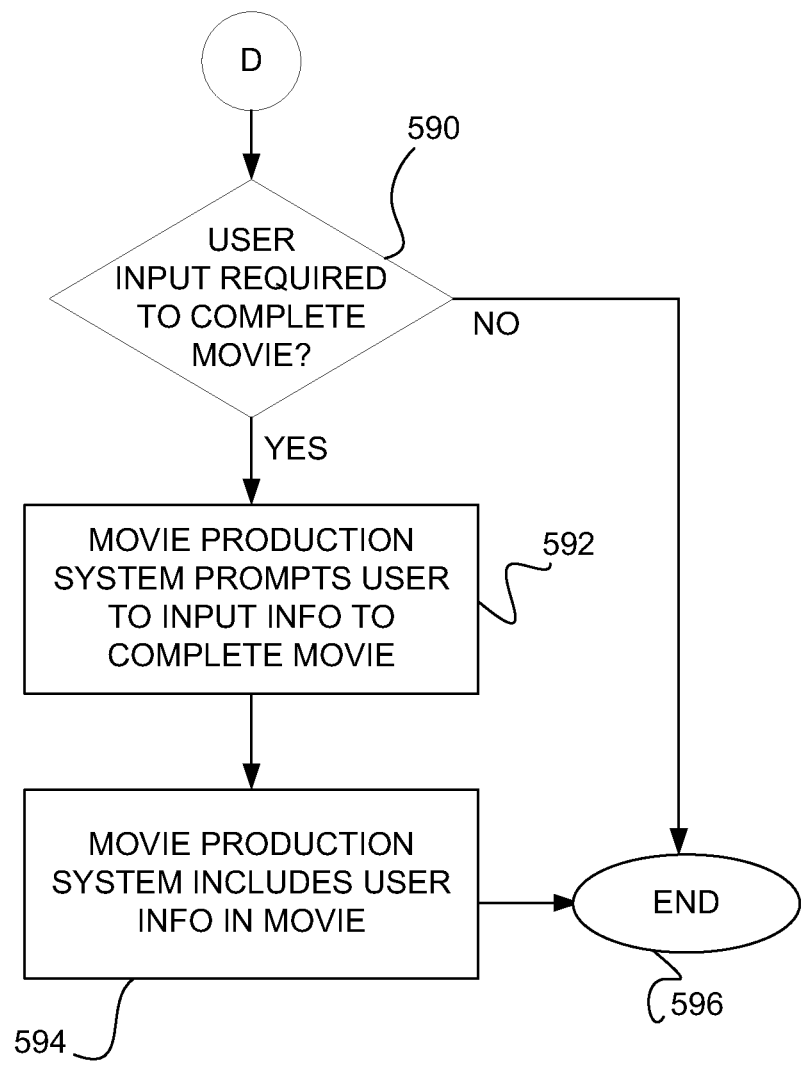

Referring to FIG. 5E, in an embodiment at decision block 590 a determination is made as to whether user input is required to complete the movie; e.g., are there one or more generic captions or titles, etc., that require user input because the necessary metadata was unavailable. If yes, in an embodiment the movie production system prompts the user to input information in order to complete the movie 592. In an aspect of this embodiment the theme application engine 120, via the UI 180, prompts the user 145 to input information to fill in blank captions and/or replace generic information in captions, titles and/or credits with personal information to complete the movie 160.

In an embodiment the movie production system includes the user-provided information in the movie as directed by one or more theme script rules 594. In an aspect of this embodiment the theme application engine 120 of the movie production system 100 includes the user-provided information in the movie 160 as directed by one or more theme script rules 175.

In an embodiment a movie has been automatically generated and processing of the user-chosen script file is ended 596.

In an embodiment if one or more additional user assets 135 are included by the user 145 for use in generating a movie 160 or one or more user assets 135 are removed by the user 145 for use in generating a movie 160 then various steps of FIGS. 5A to 5E are performed as appropriate on the new set of user assets for generation of a movie 160. For example, if a new video 115 is added by the user 145 to the set of user assets 135 to be used for a movie 160 the movie production system 100 automatically organizes the video 115 within the movie 160 and applies one or more transitions and/or one or more effects to the video frames as dictated by the theme script rules 175.

While in embodiments discussed herein tasks have been assigned to various identified components of an embodiment movie production system 100, in other embodiments the described tasks can be performed by other and/or additional system components.

Computing Device System Configuration

Figure 6:
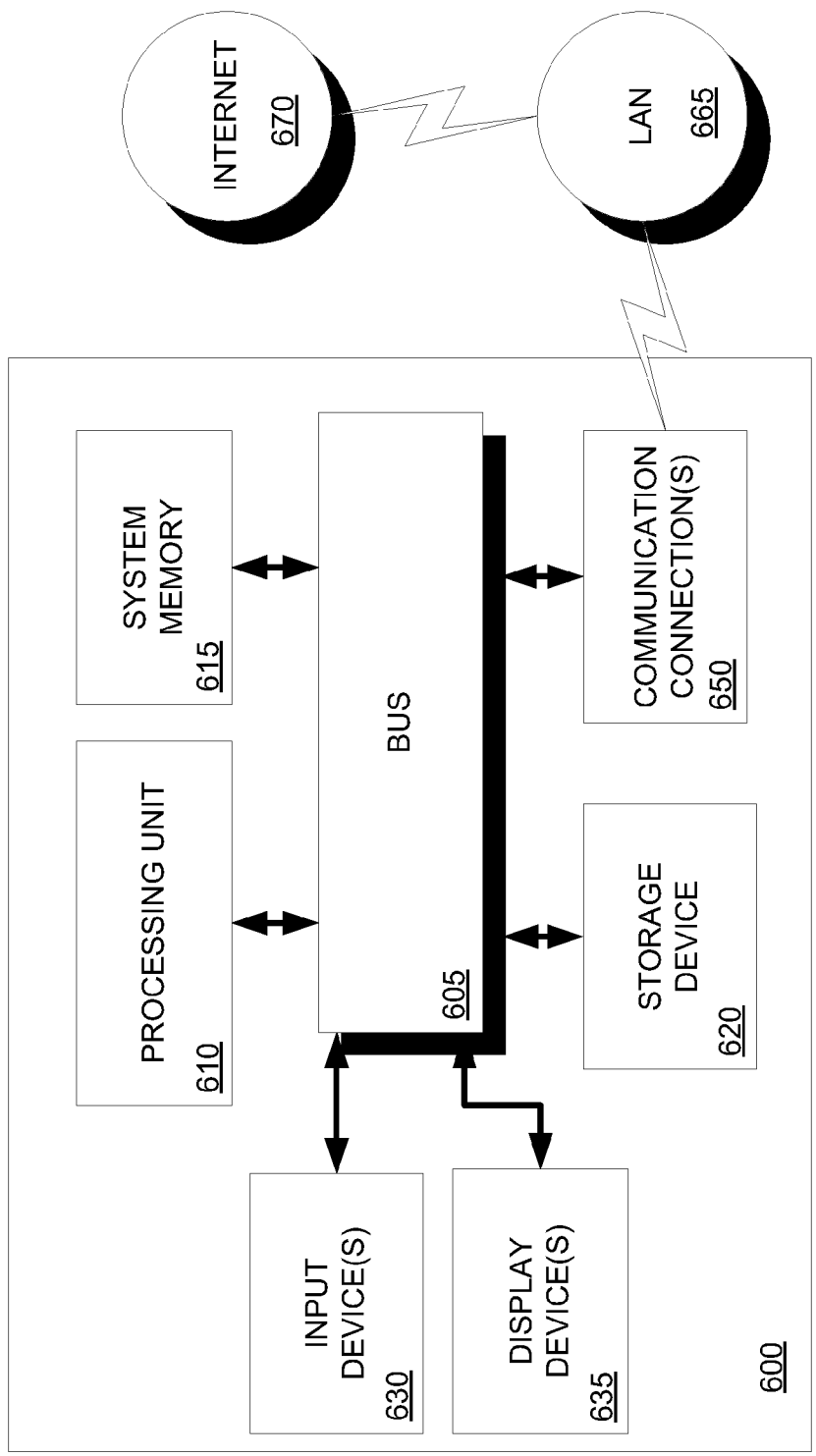
FIG. 6 is a block diagram of an exemplary basic computing device system that can process software, i.e., program code, or instructions.

FIG. 6 is a block diagram that illustrates an exemplary computing device system 600 upon which an embodiment can be implemented. The computing device system 600 includes a bus 605 or other mechanism for communicating information, and a processing unit 610 coupled with the bus 605 for processing information. The computing device system 600 also includes system memory 615, which may be volatile or dynamic, such as random access memory (RAM), non-volatile or static, such as read-only memory (ROM) or flash memory, or some combination of the two. The system memory 615 is coupled to the bus 605 for storing information and instructions to be executed by the processing unit 610, and may also be used for storing temporary variables or other intermediate information during the execution of instructions by the processing unit 610. The system memory 615 often contains an operating system and one or more programs, and may also include program data.

In an embodiment, a storage device 620, such as a magnetic or optical disk, is also coupled to the bus 605 for storing information, including program code consisting of instructions and/or data.

The computing device system 600 generally includes one or more display devices 635, such as, but not limited to, a display screen, e.g., a cathode ray tube (CRT) or liquid crystal display (LCD), a printer, and one or more speakers, for providing information to a computing device user. The computing device system 600 also generally includes one or more input devices 630, such as, but not limited to, a keyboard, mouse, trackball, pen, voice input device(s), and touch input devices, which a computing device user can use to communicate information and command selections to the processing unit 610. All of these devices are known in the art and need not be discussed at length here.

The processing unit 610 executes one or more sequences of one or more program instructions contained in the system memory 615. These instructions may be read into the system memory 615 from another computing device-readable medium, including, but not limited to, the storage device 620. In alternative embodiments, hard-wired circuitry may be used in place of or in combination with software program instructions. The computing device system environment is not limited to any specific combination of hardware circuitry and/or software.

The term "computing device-readable medium" as used herein refers to any medium that can participate in providing program instructions to the processing unit 610 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 615 and storage device 620 of the computing device system 600 are further examples of storage media. Examples of transmission media include, but are not limited to, wired media such as coaxial cable(s), copper wire and optical fiber, and wireless media such as optic signals, acoustic signals, RF signals and infrared signals.

The computing device system 600 also includes one or more communication connections 650 coupled to the bus 605. The communication connection(s) 650 provide a two-way data communication coupling from the computing device system 600 to other computing devices on a local area network (LAN) 665 and/or wide area network (WAN), including the World Wide Web, or Internet 670. Examples of the communication connection(s) 650 include, but are not limited to, an integrated services digital network (ISDN) card, modem, LAN card, and any device capable of sending and receiving electrical, electromagnetic, optical, acoustic, RF or infrared signals.

Communications received by the computing device system 600 can include program instructions and program data. The program instructions received by the computing device system 600 may be executed by the processing unit 610 as they are received, and/or stored in the storage device 620 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for automated story generation, the method comprising:
    analyzing a group of one or more assets to mine metadata and feature information from the group of assets;
    analyzing the group of assets to determine if any corrections are required for any of the assets;
    rendering at least one correction to at least one asset of the group of assets wherein an asset that is corrected is a corrected asset;
    storing the corrected assets;
    applying, by a computing device, rules of a theme script to at least one asset of the group of assets to generate a story;
    applying rules of a theme script to at least one corrected asset to generate the story;
    creating an intro section for the generated story that begins the generated story pursuant to at least one rule of the theme script, wherein the intro section comprises a title comprising metadata mined from at least one asset from the group of assets;
    creating an outro section for the generated story comprising at least one final frame of the generated story, wherein the outro section is created pursuant to at least one rule of the theme script and wherein the outro section further comprises a credit comprising metadata mined from at least one asset from the group of assets;
    generating a first caption for at least one frame of a first group of frames of the generated story pursuant to at least one rule of the theme script wherein the first caption comprises text comprising metadata mined from at least one asset of the group of assets; and
    generating a second caption for at least one frame of a second group of frames of the generated story pursuant to at least one rule of the theme script wherein the second caption is automatically generated with generic text and wherein the generic text is thereafter replaced with text created from input received from a user;
    outputting the generated story;
    encoding the generated story;
    storing the generated story; and
    publishing the generated story.

2. The method for automated story generation of claim 1 wherein publishing the generated story comprises pushing the generated story to at least one device.

3. The method for automated story generation of claim 1 wherein publishing the generated story comprises publishing the generated story to at least one publication point.

4. The method for automated story generation of claim 1, further comprising dynamically creating an element for the generated story wherein the element comprises at least one asset from the group of assets.

5. The method for automated story generation of claim 1, further comprising:
    identifying at least two assets from the group of assets to be story assets that rules of the theme script are applied to generate the story;
    grouping the story assets into at least one story chapter; and
    arranging the story assets grouped in each story chapter in an order.

6. The method for automated story generation of claim 5, further comprising:
    creating an intro section for at least one story chapter pursuant to at least one rule of the theme script wherein a created intro section for a story chapter comprises at least one beginning frame for the story chapter; and
    creating an outro section for at least one story chapter pursuant to at least one rule of the theme script wherein a created outro section for a story chapter comprises at least one final frame for the story chapter.

7. The method for automated story generation of claim 1, further comprising including music with at least one frame of the generated story pursuant to at least one rule of the theme script.

8. The method for automated story generation of claim 1 wherein outputting the generated story comprises outputting the generated story comprising a movie in a wysiwyg format.

9. The method for automated story generation of claim 1 wherein the generated story comprises a movie.

10. A method for automated generation of a movie comprising at least two frames using a theme script comprising at least one theme script rule, the method comprising:
    identifying a set of at least one asset from a group of at least two assets to be movie assets that are included in a movie;
    grouping the movie assets into at least one chapter for the movie;
    arranging the movie assets grouped in each chapter of the movie in an order;
    generating, by a computing device, an intro section for the movie pursuant to at least one theme script rule;
    generating an outro section for the movie pursuant to at least one theme script rule;
    generating a first caption for at least one frame of the movie pursuant to at least one theme script rule wherein the first caption comprises text comprising metadata mined from at least one asset of the group of at least two assets;
    generating a second caption for at least one frame of the movie pursuant to at least one theme script rule wherein the second caption is automatically generated with generic text and wherein the generic text is thereafter replaced with text created from input received from a user;
    and
    outputting the movie in a wysiwyg format.

11. The method for automated generation of a movie of claim 10, further comprising:
    automatically encoding the movie;
    automatically storing the encoded movie;

upon receiving a command to publish the movie to a device, pushing the movie to the device; and upon receiving a command to publish the movie to a publication point, publishing the movie to the publication point.

12. The method for automated generation of a movie of claim 10, further comprising:

analyzing the group of at least two assets to mine metadata from at least one asset of the group of at least two assets;

analyzing the group of at least two assets to identify at least one correction to be made to at least one asset of the group of at least two assets;

rendering an identified correction to at least one asset of the group of at least two assets;

storing an asset that has been corrected; and identifying a stored asset that has been corrected to be a movie asset included in the movie.

13. The method for automated generation of a movie of claim 12, further comprising:

automatically generating an intro section for at least one chapter of the movie pursuant to at least one theme script rule wherein a generated intro section for a chapter of the movie comprises at least one beginning frame for the chapter of the movie and wherein at least one generated intro section for a chapter of the movie comprises a title generated from metadata mined from at least one asset of the group of at least two assets; and automatically generating an outro section for at least one chapter of the movie pursuant to at least one theme script rule wherein a generated outro section for a chapter of the movie comprises at least one final frame for the chapter of the movie and wherein at least one generated outro section for a chapter of the movie comprises a credit generated from metadata mined from at least one asset of the group of at least two assets.

14. The method for automated generation of a movie of claim 10, further comprising:

rendering at least one modification to at least one movie asset pursuant to at least one theme script rule; and including at least one movie asset that is modified pursuant to at least one theme script rule within at least one chapter of the movie.

15. The method for automated generation of a movie of claim 10, further comprising:

dynamically generating an element to be included in the movie pursuant to at least one theme script rule wherein the generated element comprises at least one movie asset; and including the generated element in a chapter of the movie.

16. A movie production system for automatically generating stories, the movie production system comprising:

a computing device configured to automatically apply theme script rules to assets to generate frames for a story;

the computing device further configured to automatically analyze assets to identify asset information comprising metadata;

the computing device further configured to automatically analyze assets to identify asset modification details comprising information on assets to be modified for correction;

the computing device further configured to automatically modify assets without the need for user input;

the computing device further configured to automatically generate an introduction section for a story that begins the story, wherein the introduction section comprises a title generated from asset information;

the computing device further configured to automatically generate an end section for a story wherein the end section comprises a credit generated from asset information; and the computing device further configured to output a generated story.

17. The movie production system for automatically generating stories of claim 16, the movie production system further comprising:

the computing device further configured to receive editing commands from a user for editing at least one frame of a story;

the computing device further configured to automatically apply edits pursuant to received editing commands to at least one frame of a generated story to create an updated generated story; and the computing device further configured to output the updated generated story.

* * * * *